United States Patent
Ueno et al.

(10) Patent No.: US 11,473,697 B2
(45) Date of Patent: Oct. 18, 2022

(54) FLOW RATE ADJUSTING DEVICE

(71) Applicant: Nabtesco Corporation, Tokyo (JP)

(72) Inventors: Masayuki Ueno, Nagoya (JP); Tadashi Fujii, Nagoya (JP); Nichiki Okada, Nagoya (JP); Naoki Imai, Tokyo (JP); Shinsuke Uchida, Tokyo (JP); Ikuo Makihira, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/178,034

(22) Filed: Feb. 17, 2021

(65) Prior Publication Data
US 2021/0262585 A1  Aug. 26, 2021

(30) Foreign Application Priority Data

Feb. 21, 2020  (JP) .............................. JP2020-028070

(51) Int. Cl.
*F16K 35/02* (2006.01)
*F16K 35/10* (2006.01)
(Continued)

(52) U.S. Cl.
CPC ............ *F16K 35/10* (2013.01); *F16K 35/027* (2013.01); *B61D 19/005* (2013.01); *E05F 15/565* (2015.01);
(Continued)

(58) Field of Classification Search
CPC ............ E05F 15/565; E05Y 2201/454; E05Y 2900/51; B61D 19/005; F16K 35/00;
(Continued)

(56) References Cited

U.S. PATENT DOCUMENTS

| | | | | |
|---|---|---|---|---|
| 606,680 A | * | 7/1898 | O'Sullivan | ............. F16K 35/06 70/176 |
| 947,463 A | * | 1/1910 | Sundberg | .................. F16K 5/02 137/246.23 |

(Continued)

FOREIGN PATENT DOCUMENTS

| | | |
|---|---|---|
| JP | 5282196 B2 | 9/2013 |
| TW | 201925655 A | 7/2019 |
| WO | 2015/052098 A1 | 4/2015 |

OTHER PUBLICATIONS

Office Action dated Apr. 12, 2022, issued in corresponding Taiwanese Patent Application No. 110105511 with English translation (7 pgs.).

*Primary Examiner* — Kevin F Murphy
*Assistant Examiner* — Jonathan J Waddy
(74) *Attorney, Agent, or Firm* — Pillsbury Winthrop Shaw Pittman, LLP

(57) ABSTRACT

A flow rate adjusting device of the present invention includes a flow channel member and a valve mechanism. The valve mechanism includes a rod, a knob and a lock mechanism. The lock mechanism is switched by the knob moving in the traverse direction between a prohibited state in which the engaging portion is engaged with the to-be-engaged portion so that the rotation of the rod relative to the flow channel member is prohibited via the knob and a permitted state in which the engagement between the engaging portion and the to-be-engaged portion is undone so that the rod is permitted to rotate relative to the flow channel member.

17 Claims, 8 Drawing Sheets

(51) Int. Cl.
　　　*E05F 15/56*　　　(2015.01)
　　　*B61D 19/00*　　　(2006.01)
(52) U.S. Cl.
　　　CPC ..... *E05Y 2201/454* (2013.01); *E05Y 2900/51* (2013.01)
(58) Field of Classification Search
　　　CPC .......... F16K 35/02; F16K 35/04; F16K 35/10; F16K 35/022; F16K 35/025; F16K 35/027
　　　USPC ........ 70/175, 176; 251/95, 96, 99, 101–116, 251/269, 264, 266, 270–272
　　　See application file for complete search history.

(56) References Cited

U.S. PATENT DOCUMENTS

| | | | | |
|---|---|---|---|---|
| 1,039,386 | A * | 9/1912 | Grove et al. | F16K 35/027 251/96 |
| 1,089,098 | A * | 3/1914 | Winkler | F16K 35/027 251/96 |
| 1,179,377 | A * | 4/1916 | Stenger | F16K 35/02 251/102 |
| 1,243,558 | A * | 10/1917 | Ryan | F16K 35/06 70/176 |
| 1,316,585 | A * | 9/1919 | Logan | F16K 1/02 251/269 |
| 1,428,933 | A * | 9/1922 | Bean, Jr. | F16L 29/002 251/89.5 |
| 1,444,780 | A * | 2/1923 | Davis | F16K 35/10 251/113 |
| 1,689,236 | A * | 10/1928 | Fraser, Jr. | F16K 35/025 116/277 |
| 1,730,305 | A * | 10/1929 | Stancu, Jr. | F16K 1/50 251/116 |
| 1,801,175 | A * | 4/1931 | Possons | F16K 35/02 251/96 |
| 1,921,846 | A * | 8/1933 | Sparks | F16K 5/162 251/312 |
| 2,198,639 | A * | 4/1940 | Stines | F16K 3/18 251/167 |
| 2,845,083 | A * | 7/1958 | Graybill | F16K 15/18 137/329.2 |
| 3,054,303 | A * | 9/1962 | Maney | F16K 35/027 74/504 |
| 3,921,955 | A * | 11/1975 | Haddad, Jr. | F16K 1/221 251/297 |
| 5,076,308 | A * | 12/1991 | Cohen | F16K 37/0016 137/1 |
| 5,284,178 | A * | 2/1994 | Lardieri | F16K 1/2263 137/315.23 |
| 5,490,660 | A * | 2/1996 | Kamezawa | F16K 35/027 251/96 |
| 9,803,776 | B2 * | 10/2017 | Akamoto | F16K 35/025 |
| 9,835,354 | B2 * | 12/2017 | Yoskowitz | F24F 13/14 |
| 10,352,461 | B2 * | 7/2019 | Akamoto | F16K 31/508 |
| 2010/0101286 | A1 * | 4/2010 | Yoon | F16K 35/06 70/175 |
| 2013/0234056 | A1 * | 9/2013 | Giacomini | F16K 35/027 251/96 |
| 2018/0180189 | A1 * | 6/2018 | Bell | F15B 13/0401 |

* cited by examiner

FLOW RATE ADJUSTING DEVICE

CROSS-REFERENCE TO RELATED APPLICATIONS

This application is based on and claims the benefit of priority from Japanese Patent Application Serial No. 2020-028070 (filed on Feb. 21, 2020), the contents of which are hereby incorporated by reference in their entirety.

TECHNICAL FIELD

The present invention relates to a flow rate adjusting device.

BACKGROUND

A door unit installed in, for example, railroad vehicles includes a door body for opening and closing an opening of a vehicle body and a door driving device for sliding the door body in directions to open and close the opening. The door driving device has a cylinder including a cylinder rod connected to the door body and a flow rate adjusting device for adjusting the amount of air to be fed to or discharged from the cylinder. The door driving device uses the flow rate adjusting device to adjust the amount of air to be fed to or discharged from the cylinder. In this way, the door driving device can adjust, for example, the rate of acceleration of the door body during the movement.

An example flow rate adjusting device is disclosed in Japanese Patent No. 5282196 (the '196 patent) and includes a body having a port connecting together a fluid compressor and a tube and a needle valve for adjusting the ratio of opening of the port by moving in the axial direction as it rotates on its axis.

According to the disclosure of the '196 patent, the needle valve is rotatable by a handle, and as the handle moves in the axial direction relative to the needle valve, the needle valve is switched between a rotatable state in which the needle valve can rotate relative to the body and a non-rotatable state in which the needle valve can not rotate relative to the body. According to the disclosure of the '196 patent, the needle valve is rotated relative to the body to adjust the axial position of the needle valve. This can adjust the flow rate of the fluid discharged from the fluid compressor, passing through the port and fed into the tube.

The above-described conventional technique, however, can stand further improvement. Since the flow rate adjusting device has a body serving as a coupler for connecting together the fluid compressor and the tube, the protrusion of the flow rate adjusting device from the fluid compressor should be reduced. Such a conventional flow rate adjusting device encounters difficulties when it is desired to install the flow rate adjusting device in a limited space, for example, in a railroad vehicle.

SUMMARY

The present invention provides a flow rate adjusting device protruding less from a flow channel member.

The above object can be achieved by a flow rate adjusting device relating to one embodiment of the present invention including a flow channel member having a flow channel formed therein, where a fluid flows through the flow channel, and a valve mechanism for adjusting a ratio of opening of the flow channel. The valve mechanism includes a rod extending in a traverse direction traversing the flow channel, where the rod is movable in the traverse direction when rotated on an axis extending along the traverse direction, so that the rod touches or separates from a valve seat formed on an inner surface of the flow channel, a knob attached to a portion of the rod that is outside the flow channel member, where the knob is integrally rotatable with the rod and is movable in the traverse direction relative to the rod, and a lock mechanism having an engaging portion and an to-be-engaged portion, where the engaging portion protrudes from one of the flow channel member and the knob, and the to-be-engaged portion is formed in the other of the flow channel member and the knob and configured to be engaged with the engaging portion when accommodating the engaging portion therein. The lock mechanism is switched by the knob moving in the traverse direction between (i) a prohibited state in which the engaging portion is engaged with the to-be-engaged portion so that the rotation of the rod relative to the flow channel member is prohibited via the knob and (ii) a permitted state in which the engagement between the engaging portion and the to-be-engaged portion is undone so that the rod is permitted to rotate relative to the flow channel member.

In the present embodiment, the flow rate adjusting device includes a knob rotatable integrally with the rod and movable in the traverse direction relative to the rod. With such a design, the rotational force applied to the knob also acts on the rod, so that the rod can be rotated via the knob. Such configurations can accomplish improved workability when compared with the case where, for example, the rod is rotated using a mechanical tool or the like. In the present embodiment, the knob moves in the traverse direction relative to the rod, which can switch whether the rod is in the prohibited state or the permitted state. When compared with the conventional design where a separately prepared nut is fastened on the rod so that the rotation of the rod is prohibited by axial force applied between the rod and the flow channel member via the nut, the above-described design can highly accurately adjust the position of the rod in the traverse direction. In the conventional art, the position of the rod in the traverse direction is adjusted, after which the rod may move out of the position in the axial direction when the nut is fastened on the rod to fix the position. Such a movement can be prevented by the present embodiment. As a result, a desired ratio of opening can be achieved in a simplified manner for the flow channel by manipulating the valve mechanism. In particular, the rod and knob are rotatably attached to the flow channel member having the flow channel formed therein in the present embodiment. According to this design, since the rotation of the knob relative to the flow channel member is prohibited or permitted, the rod and knob may protrude less from the flow channel member when compared with the case where a separately prepared body or other member is attached as a coupler connecting together the flow channel member and other members. This can reduce the size of the flow rate adjusting device. As a consequence, the flow rate adjusting device can be easily installed within a limited space such as a railroad vehicle. In addition, since the rod and knob are supported on the flow channel member, the valve mechanism can be easily supported with sufficient force.

In the flow rate adjusting device of the above embodiment, the knob may be closer to the flow channel member in the prohibited state than in the permitted state.

In the flow rate adjusting device of the above embodiment, the valve mechanism may include an energizing member for energizing the knob in such a direction that the prohibited state is to be achieved.

In the flow rate adjusting device of the above embodiment, the rod may have a shaft extending in the traverse direction, and a rod flange having a larger outer diameter than the shaft, the knob may have a knob flange facing the rod flange in the traverse direction, and the energizing member may be interposed between the rod flange and the knob flange with the shaft being inserted into the energizing member.

In the flow rate adjusting device of the above embodiment, the knob may surround the rod.

In the flow rate adjusting device of the above embodiment, the knob may have a grip depressed into an outer peripheral surface of the knob.

In the flow rate adjusting device of the above embodiment, an outer peripheral surface of the rod and an inner peripheral surface of the knob may have a flat surface extending in a direction intersecting the traverse direction in a planar view as seen in the traverse direction, and the knob may not be allowed to rotate relative to the rod when the flat surface of the outer peripheral surface of the rod is engaged with the flat surface of the inner peripheral surface of the knob.

In the flow rate adjusting device of the above embodiment, the engaging portion may protrude from the flow channel member in the traverse direction, the to-be-engaged portion may be a depression in a surface of the knob facing the flow channel member and depressed in the traverse direction, and the engaging portion may be engaged with the to-be-engaged portion in a circumferential direction around the axis when the knob is in the prohibited state.

In the flow rate adjusting device of the above embodiment, the engaging portion may be a pin pressed into a depression formed in the flow channel member.

In the flow rate adjusting device of the above embodiment, a plurality of the engaging portions and a plurality of the to-be-engaged portions may be arranged in the circumferential direction, and the number of the to-be-engaged portions may be greater than the number of the engaging portions.

In the flow rate adjusting device of the above embodiment, the flow channel member may have a communicating portion formed therein through which inside of the flow channel is in communication with outside of the flow channel in the traverse direction, and the rod may be inserted through the communicating portion. A sealing ring may be interposed between an outer peripheral surface of the rod and an inner peripheral surface of the communicating portion, surround the rod, and seal, in a direction intersecting the traverse direction in a planar view as seen in the traverse direction, between the outer peripheral surface of the rod and the inner peripheral surface of the communicating portion.

Advantageous Effects

According to the above-described embodiments, the flow rate adjusting device can protrude less from the flow channel member.

DESCRIPTION OF THE PREFERRED EMBODIMENTS

Figure 1:
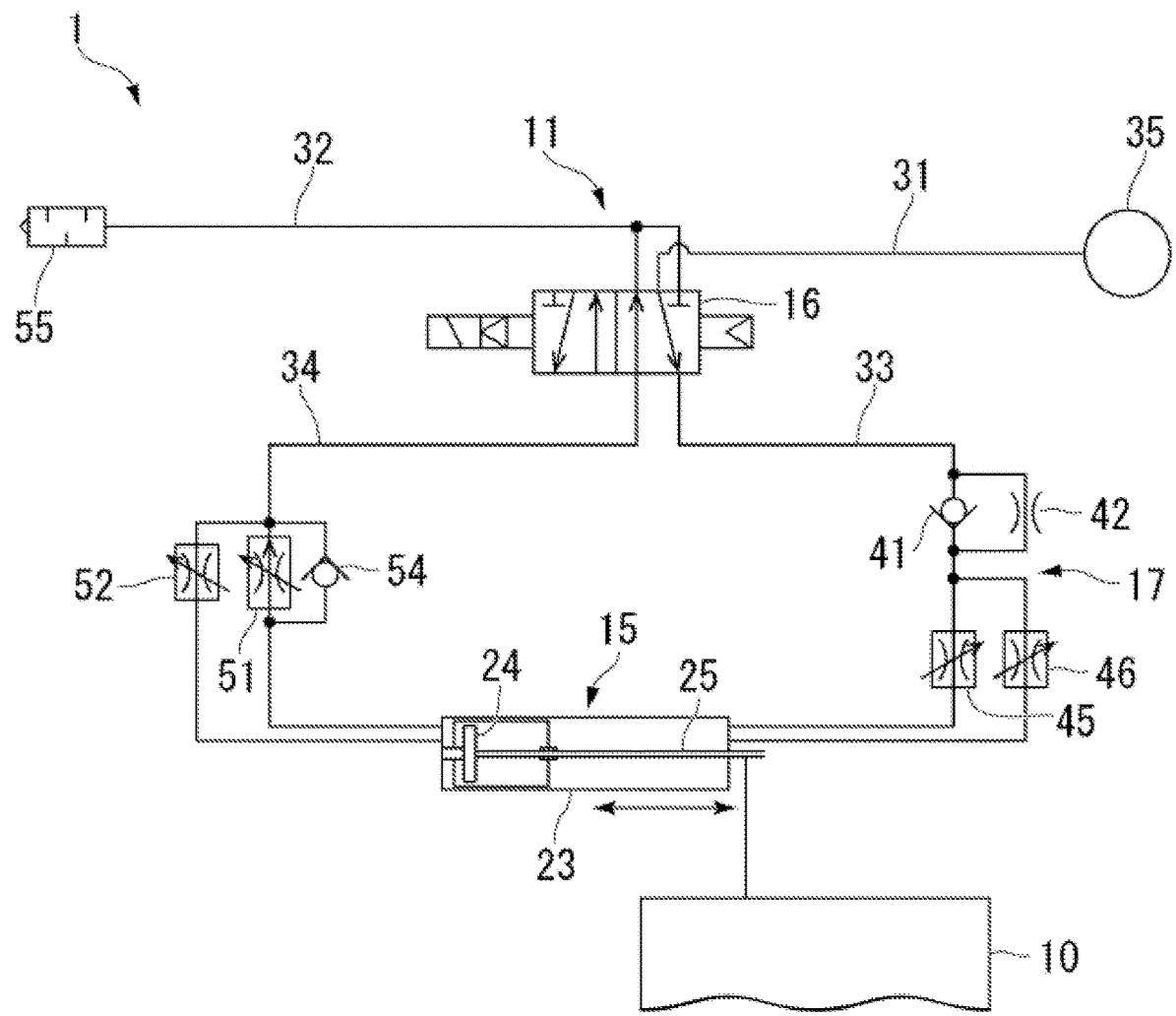
FIG. 1 schematically shows the structure of a door unit relating to an embodiment of the invention.

Embodiments of the present invention will be hereinafter described with reference to the drawings. In the following description of the embodiments and modifications, the corresponding elements will be denoted by the same reference numerals and may not be repeatedly described. In the following description, such terms as "parallel," "orthogonal," "center" and "coaxial" may appear to describe relative or absolute positions. These terms are not only strictly used but also allow some tolerances and relative differences in angle and distance as long as the same effects can be still produced.

<Door Unit 1>

FIG. 1 schematically shows the structure of a door unit 1. As shown in FIG. 1, the door unit 1 is installed in, for example, a railroad vehicle. The door unit 1 includes a door body 10 and a door driving device 11. In the following description, the "front-and-rear," "top-and-bottom (upper-and-lower)" and "left-and-right" directions are defined with the traveling direction of the railroad vehicle being treated as the "front-and-rear" direction. The door body 10 is configured to open and close an opening formed in the body of the vehicle. The door body 10 is supported by the vehicle body such that the door body 10 can slide in the front-and-rear direction along the plane of the opening. In the present embodiment, the door body 10 is, for example, a single swinging door. Alternatively, the door body 10 may be a double swinging door or the like.

<Door Driving Device 11>

The door driving device 11 is arranged in a space between the external wall and the internal wall of the vehicle body, for example, in a portion positioned above the door body 10. The door driving device 11 includes a cylinder 15, a solenoid switching valve 16 and a flow rate adjusting device 17. The cylinder 15 includes a cylinder head 23, a piston 24 sectioning the space within the cylinder head 23, and a cylinder rod 25 connecting together the piston 24 and the door body 10. The piston 24 is moved in the axial direction of the cylinder head 23 by the pressure applied by the fluid (for example, a gas) fed into and discharged from first and second sides defined within the cylinder heard 23 with respect to the piston 24. Since the cylinder rod 25 moves forward and back in the axial direction relative to the cylinder head 23, the door body 10 moves together with the cylinder rod 25 and thus slides.

The solenoid switching valve 16 switches the destination of the gas discharged from a pump 35 in response to a manipulation signal from a door control panel provided on the vehicle body.

<Flow Rate Adjusting Device 17>

The flow rate adjusting device 17 adjusts the flow rate of the gas flowing into the cylinder 15 via the solenoid switching valve 16. The flow rate adjusting device 17 includes a plurality of flow channels 31 to 34 diverging from the solenoid switching valve 16. The flow channels 31 to 34 are specifically a feeding flow channel 31, a discharging flow channel 32, an opening flow channel 33 and a closing flow channel 34.

The feeding flow channel 31 connects together the solenoid switching valve 16 and the pump 35. The opening flow channel 33 connects together the solenoid switching valve 16 and a portion of the cylinder head 23 that is positioned on the first side relative to the piston 24. The opening flow channel 33 passes through a check valve 41 and a throttle 42, which are arranged in parallel. Downstream the check valve 41 and the throttle 42, the branches of the opening flow channel 33 merge. The opening flow channel 33 then passes through a rate of opening adjusting screw 45 and an opening deceleration adjusting screw 46, which are arranged in parallel.

The closing flow channel 34 connects together the solenoid switching valve 16 and a portion of the cylinder head 23 that is positioned on the second side relative to the piston 24. The closing flow channel 34 passes through a rate of closing adjusting screw 51, a closing deceleration adjusting screw 52 and a check valve 54, which are arranged in parallel.

The discharging flow channel 32 discharges, to the outside the door driving device 11, the gas that has passed through the cylinder hard 23. On the downstream end of the discharging flow channel 32, a silencer 55 is provided. In the door driving device 11 relating to the present embodiment, the adjusting screws 45, 46, 51 and 52 are manipulated to adjust the ratio of opening of the opening and closing flow channels 33 and 34, so that the pressure of the gas within the cylinder head 23 is adjusted and the rate of acceleration or deceleration is resultantly adjusted during the opening or closing of the door body 10.

Figure 2:
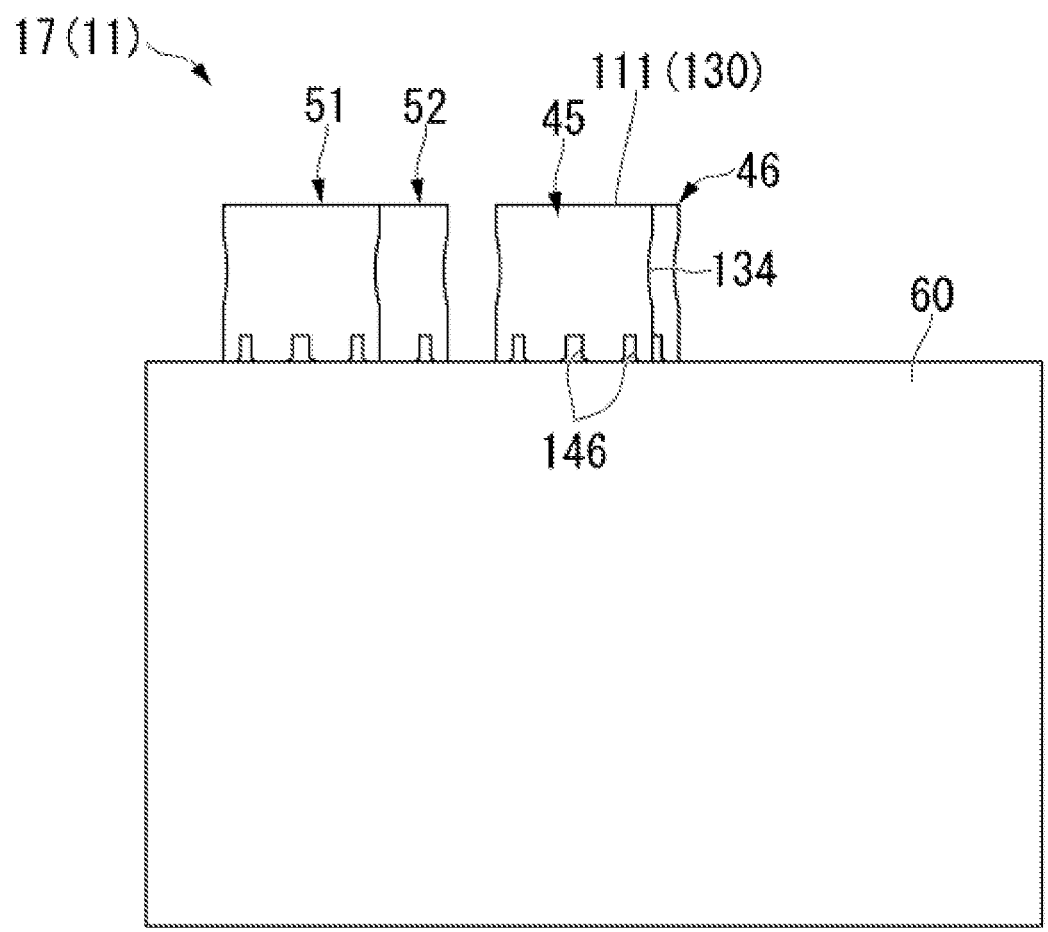
FIG. 2 is a side view showing a flow rate adjusting device relating to an embodiment of the invention.

The following describes the above-described flow rate adjusting device 17 in detail. FIG. 2 is a side view showing the flow rate adjusting device 17. As shown in FIG. 2, the flow rate adjusting device 17 includes a tube socket (flow channel member) 60 having the above-described flow channels 31 to 34 (see FIG. 1) formed therein and the adjusting screws (valve mechanisms) 45, 46, 51 and 52 attached to the tube socket 60. In the flow rate adjusting device 17, the adjusting screws 45, 46, 51 and 52 are all configured in the same manner. Thus, the following description is made taking the rate of opening adjusting screw 45 and the opening flow channel 33 as an example. As an alternative example, the feeding flow channel 31 and the discharging flow channel 32 may be provided separately from the tube socket 60.

<Tube Socket 60>

Figure 3:
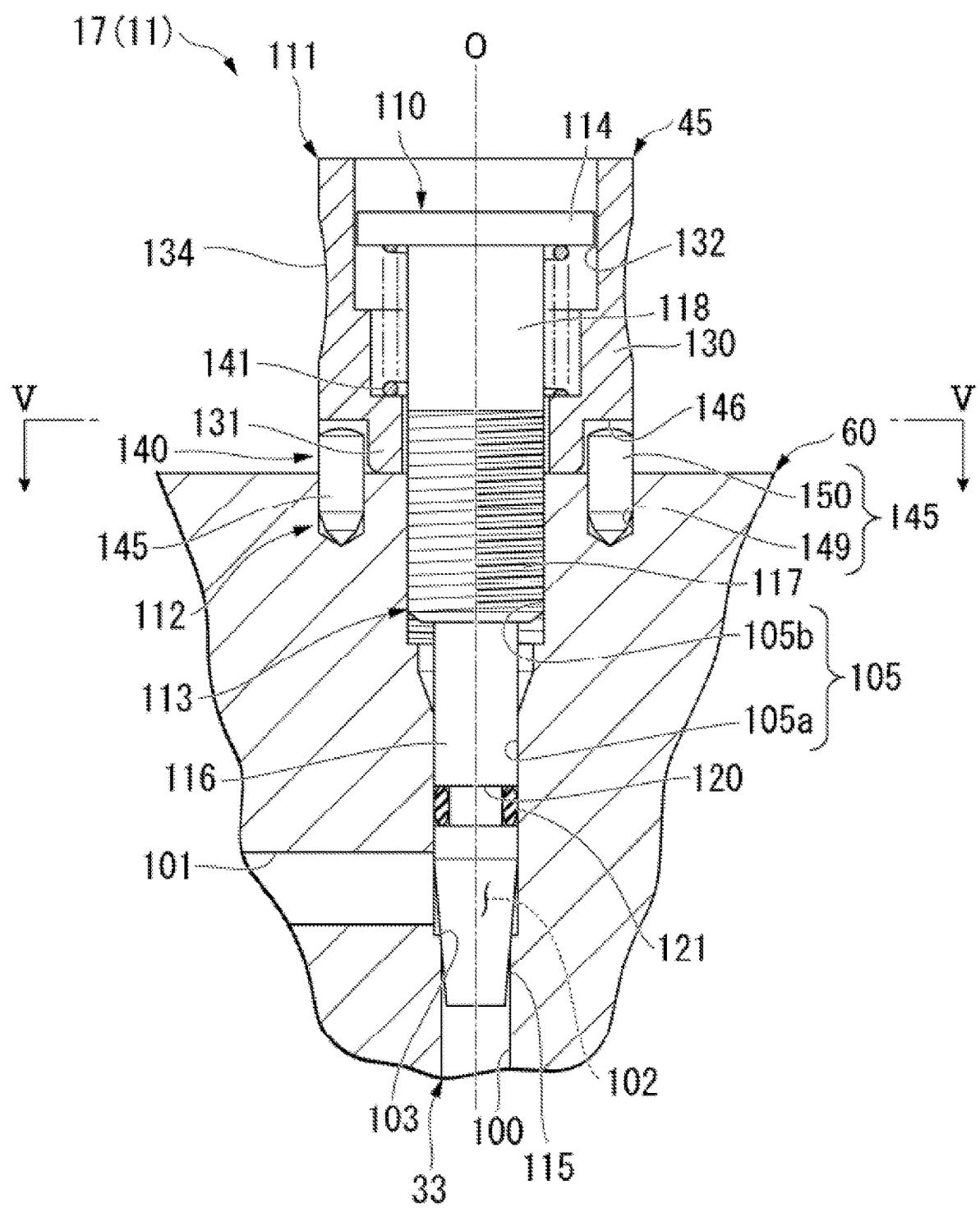
FIG. 3 is a sectional view showing the flow rate adjusting device along a line III-III in FIG. 4.
Figure 4:
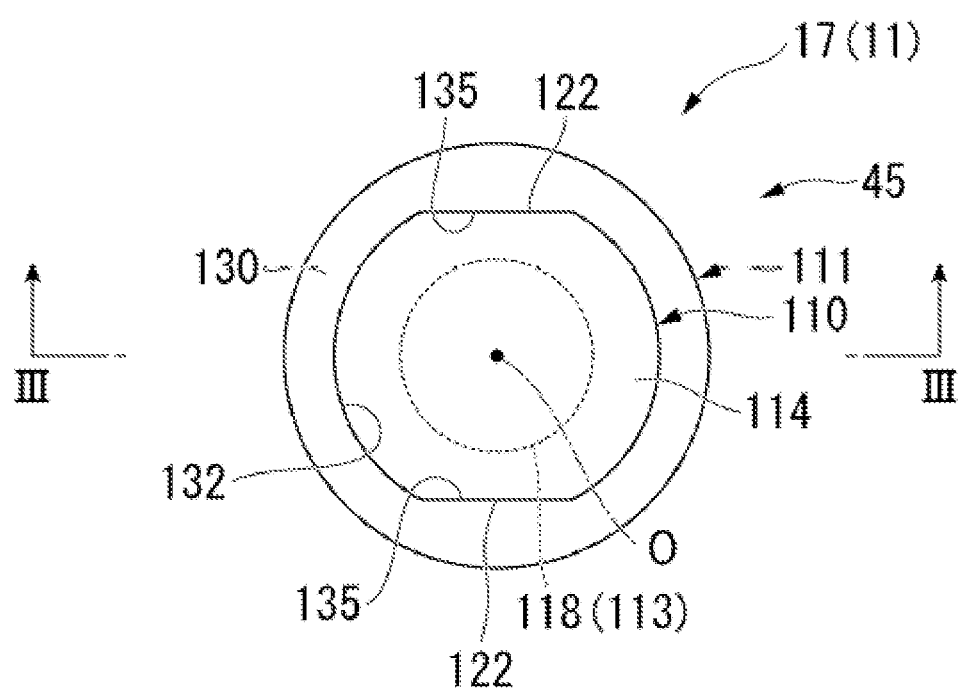
FIG. 4 is a plan view of the flow rate adjusting device relating to the embodiment of the invention.

FIG. 3 is a sectional view showing the flow rate adjusting device 17 along a line in FIG. 4. As shown in FIG. 3, the tube socket 60 is made of a metal material and the like and formed in a block shape. While the tube socket 60 has the flow channels 31 to 34 formed therein, for example, the opening flow channel 33 includes a first flow channel 100, a second flow channel 101, and a connecting flow channel 102.

In the present embodiment, the first and second flow channels 100 and 101 extend in intersecting directions. Here, the flow channels 100 and 101 may linearly extend. The connecting flow channel 102 connects together the flow channels 100 and 101. Specifically, while having an enlarged diameter compared with the first flow channel 100, the connecting flow channel 102 is linearly aligned with the first flow channel 100. The step formed between the connecting flow channel 102 and the first flow channel 100 constitutes a valve seat 103.

The tube socket 60 has a communicating portion 105 formed therein, through which the inside of the opening flow channel 33 is in communication with the outside of the opening flow channel 33. The communicating portion 105 extends such that it is linearly aligned with the first flow channel 100 and the connecting flow channel 102. The communicating portion 105 is open to the inside of the connecting flow channel 102 and through the surface of the tube socket 60. A portion of the communicating portion 105 that is closer to the connecting flow channel 102 constitutes a sliding portion 105a. The sliding portion 105a has a smooth surface along the entire circumference thereof. In relation to the sliding portion 105a, a portion of the communicating portion 105 that is closer to the surface of the tube socket 60 constitutes a female screw portion 105b.

<Rate of Opening Adjusting Screw 45>

The rate of opening adjusting screw 45 is configured to adjust the flow rate of the gas flowing through the connecting flow channel 102 between the first flow channel 100 and the second flow channel 101. Specifically, the rate of opening adjusting screw 45 includes a rod 110, a knob 111 and a lock mechanism 112.

The rod 110 is inserted into the opening flow channel 33 through the communicating portion 105. The rod 110 is formed in a columnar shape extending in a direction traverse the opening flow channel 33 (connecting flow channel 102). In the following description, the direction in which the axis O of the rod 110 extends is simply referred to as the axial direction (traverse direction). Furthermore, in the axial direction, when something is on the front-end side, this means that it is closer to the opening flow channel 33, and when something is on the base end side, this means that it is more distant from the opening flow channel 33. In the planar view when seen in the axial direction, a radial direction denotes the direction orthogonal to the axial direction and a circumferential direction denotes the direction going around the axis O.

The rod 110 is supported in the tube socket 60 such that the rod 110 is movable in the axial direction. The rod 110 has a shaft 113 and a rod flange 114 projecting from the base end portion of the shaft 113. The shaft 113 has an outer diameter increasing in a stepwise manner from the front-end side toward the base end side. Specifically, the shaft 113 is made up by a seat portion 115, a sealing portion 116, a male screw portion 117 and a protruding portion 118 that are connected in series in the stated order from the front-end side toward the base end side.

The seat portion 115 has an outer diameter gradually decreasing from the base end side toward the front-end side. As the rod 110 moves in the axial direction, the outer peripheral surface of the seat portion 115 touches or separates away from the valve seat 103. While the seat portion 115 is in contact with the valve seat 103 (hereinafter, simply referred to as the valve closed state), the seat portion 115 disconnects the communication between the first flow channel 100 and the second flow channel 101 through the connecting flow channel 102. In the valve closed state, the seat portion 115 traverses the connecting flow channel 102 in the axial direction with the front end thereof being inserted into the first flow channel 100.

The sealing portion 116 is connected to the base end side of the seat portion 115 and has an increased outer diameter when compared with the seat portion 115. The sealing portion 116 is arranged in the sliding portion 105a mentioned above. A sealing groove 120 is formed in the sealing portion 116. The sealing groove 120 is open at the outer peripheral surface of the sealing portion 116 and extends over the entire circumference of the sealing portion 116. In the sealing groove 120, a sealing ring 121 is fitted. The sealing ring 121 is made of, for example, an elastically deformable resin material, a rubber material or the like. In the sectional view along the axial direction, the sealing ring 121 is formed in a circular shape in its initial state (in natural length). The sealing ring 121 is interposed between the sealing portion 116 (the inner surface of the sealing groove 120) and the inner peripheral surface of the sliding portion 105a while being squeezed in the radial direction. This results in the sealing ring 121 radially sealing between the rod 110 and the tube socket 60. The sealing ring 121 slides on the inner peripheral surface of the sliding portion 105a as the rod 110 moves.

The male screw portion 117 is connected to the base end side of the sealing portion 116 and has an increased outer diameter when compared with the sealing portion 116. The male screw portion 117 is fastened by the female screw portion 105b mentioned above. Accordingly, as the rod 110 is rotated in the circumferential direction around the axis O in such a direction that the male screw portion 117 is fastened, the rod 110 moves in the axial direction such that the seat portion 115 moves toward the valve seat 103 (hereinafter, in the valve closing direction). On the other hand, as the rod 110 is rotated in the circumferential direction around the axis O in such a direction that the male screw portion 117 is unfastened, the rod 110 moves in the axial direction such that the seat portion 115 moves away from the valve seat 103 (hereinafter, in the valve opening direction). The rod 110 is only required to be capable of moving in the axial direction when rotated around the axis O. The rod 110 is not limited to a combination of the male screw portion 117 and the female screw portion 105b and can be, for example, a combination of a depression and a protrusion.

The protruding portion 118 is connected to the base end side of the male screw portion 117. The protruding portion 118 protrudes in the axial direction through the surface of the tube socket 60.

FIG. 4 is a plan view showing the flow rate adjusting device 17. As shown in FIG. 4, the rod flange 114 radially extends from the base end portion of the protruding portion 118. In the present embodiment, the rod flange 114 has a rod rotation stopping portion 122 formed thereon. The rod rotation stopping portion 122 is a flat surface obtained by partially cutting off the outer peripheral portion of the rod flange 114 and parallel to the tangent direction of the rod flange 114 (as viewed from above, the direction intersecting the traverse direction). In the present embodiment, a pair of rod rotation stopping portions 122 are formed on the rod flange 114 so as to positioned opposite each other in the radial direction.

As is clear from FIG. 3, the knob 111 is shaped like a tube coaxially arranged with the axis O. The knob 111 is movable in the axis direction relative to the rod 110 but not rotatable relative to the rod 110 and surrounds the rod 110. The knob 111 has a base tube portion 130, a knob flange 131 and an expansion portion 132. The base tube portion 130 constitutes the outline of the knob 111. When the rod 110 is at least in the above-mentioned valve closed state, the base end of the base tube portion 130 is more distant from the tube socket 60 than the base end of the rod 110 (the rod flange 114) is. Note that, however, the axial length of the base tube portion 130 can be changed as appropriate. For example, the base tube portion 130 may surround the entire protrusion of the rod 110 through the tube socket 60 irrespective of where the rod 110 is positioned in the axial direction.

A grip 134 is formed in the axially central portion of the base tube portion 130. In the present embodiment, the grip 134 is a depression that is formed on the outer peripheral surface of the base tube portion 130 over the entire circumference of the base tube portion 130 and depressed inwardly in the radial direction. The grip 134 may be only required to be shaped such that the grip 134 can be more easily gripped than the other portion of the base tube portion 130. The grip 134 may be alternatively, for example, a depression or protrusion extending over a partial circumference or a knurled portion.

The knob flange 131 extends inwardly in the radial direction from the front-end portion of the base tube portion 130. The knob flange 131 is opposite the above-described rod flange 114 in the axial direction. The expansion portion 132 is depressed outwardly in the radial direction at the base end portion of the base tube portion 130. The expansion portion 132 has an inner peripheral surface of the same shape as the rod flange 114 as viewed from above.

As shown in FIG. 4, knob rotation stopping portions 135 bulging inwardly in the radial direction are formed on the inner peripheral surface of the expansion portion 132. The knob rotation stopping portions 135 are a flat surface extending in the same manner as the above-mentioned rod rotation stopping portions 122 (in the direction parallel to the tangent direction of the rod flange 114). The rod 110 is inserted into the knob 111 while the rod rotation stopping portion 122 is aligned with the knob rotation stopping portion 135 in the circumferential direction. In this way, when an attempt is made to rotate the rod 110 around the axis O relative to the knob 111, the rod 110 is not allowed to rotate relative to the knob 111 since the rotation stopping portions 122 and 135 are in contact with each other. This means that the rod 110 and the knob 111 are designed to integrally rotate relative to the tube socket 60. The rotation stopping portions 122, 135 can be modified as appropriate as long as they allow the rod 110 and the knob 111 to integrally rotate. For example, the rotation stopping portions 122, 135 may be achieved by the rod flange 114 and the expansion portion 132 having a shape other than a perfect circle (for example, a polygonal shape) or by engagement between depressions and protrusions or between splines.

As shown in FIG. 3, the lock mechanism 112 includes a prohibition mechanism 140 and an energizing member 141. The prohibition mechanism 140 includes a tube socket engaging portion (engaging portion) 145 and a knob engaging portion (to-be-engaged portion) 146.

The tube socket engaging portion 145 is formed on the surface of the tube socket 60 and positioned so as to face the outer peripheral portion of the knob 111 in the axial direction. The tube socket engaging portion 145 is configured such that a pin 150 is fitted (for example, pressed) into a depression 149 formed on the surface of the tube socket 60. The pin 150 is shaped like a column extending parallel to the axial direction, for example. The pin 150 protrudes in the axial direction through the surface of the tube socket 60. A plurality of tube socket engaging portions 145 are arranged at intervals in the circumferential direction around the axis O. In the illustrated example, two tube socket engaging portions 145 are formed and arranged with an interval of 180° in the circumferential direction. Note that, however, the number, pitch and other parameters of the tube socket engaging portions 145 can be changed as appropriate.

Figure 5:
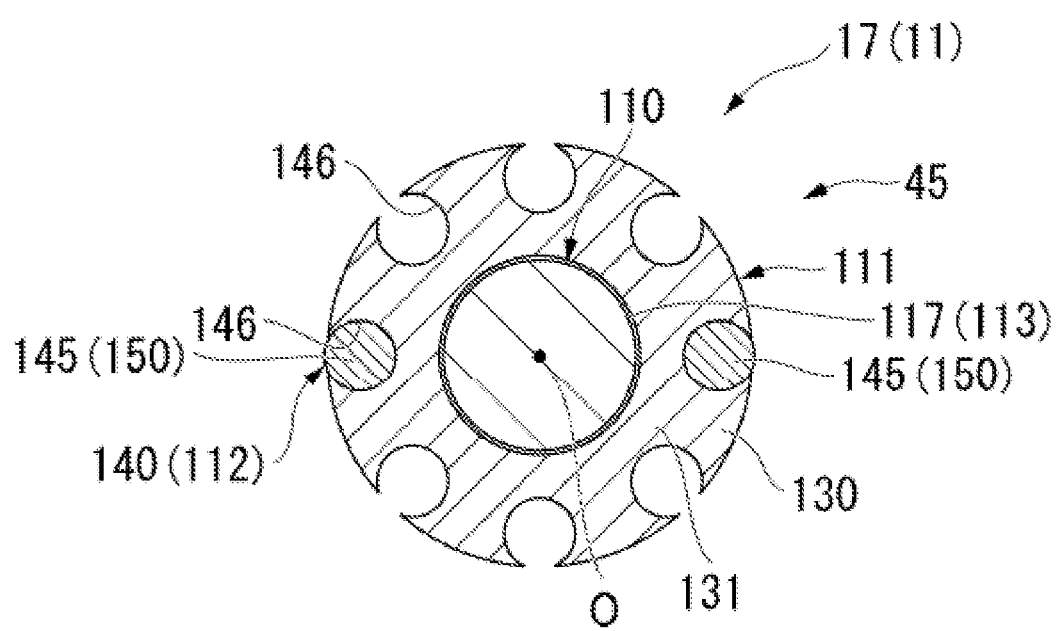
FIG. 5 is a sectional view showing the flow rate adjusting device along a line V-V in FIG. 3.

FIG. 5 is a sectional view showing the flow rate adjusting device 17 along a line V-V in FIG. 3. As shown in FIGS. 3 and 5, the knob engaging portion 146 is a depression open through the front-end surface of the knob 111. Specifically, the knob engaging portion 146 is formed in a circular shape larger than the outline of the pin 150 as viewed from above. The radially outer portion of the knob engaging portion 146 is open through the outer peripheral surface of the knob 111. A plurality of knob engaging portions 146 are arranged at intervals in the circumferential direction on the single circle the radius of which is the line connecting together the axis O and the tube socket engaging portion 145. In the present embodiment, the interval between the adjacent ones of the knob engaging portions 146 in the circumferential direction is less than the interval between the adjacent ones of the tube socket engaging portions 145 in the circumferential direction. Specifically, the knob engaging portions 146 are arranged at pitches of 45° in the circumferential direction. Note that, however, the number, pitch and other parameters of the knob engaging portions 146 can be changed as appropriate provided that the number is equal to or greater than the number of the tube socket engaging portions 145.

As the knob 111 moves in the axial direction relative to the rod 110, the prohibition mechanism 140 is switched between the engagement and the non-engagement between the knob engaging portions 146 and the tube socket engaging portions 145. The prohibition mechanism 140 is specifically described. As the knob 111 approaches or touches, in the axial direction, the tube socket 60 with the tube socket engaging portions 145 being positioned so as to overlap selected ones of the knob engaging portions 146 when seen from above, the tube socket engaging portions 145 are accommodated within the selected ones of the knob engaging portions 146. When the tube socket engaging portions 145 are engaged in the circumferential direction with the selected ones of the knob engaging portions 146 in this way, this prohibits the rotation of the knob 111 relative to the tube socket 60 around the axis O (the prohibited state). In the present embodiment, when a certain member is engaged with another member, this means, in the broad sense, that the two members are physically in contact with each other in a certain direction and, in the narrow sense, that the two members are in contact with each other such that their surfaces facing the relative movement direction abut each other, thereby prohibiting the relative movement between the two members.

Figure 6:
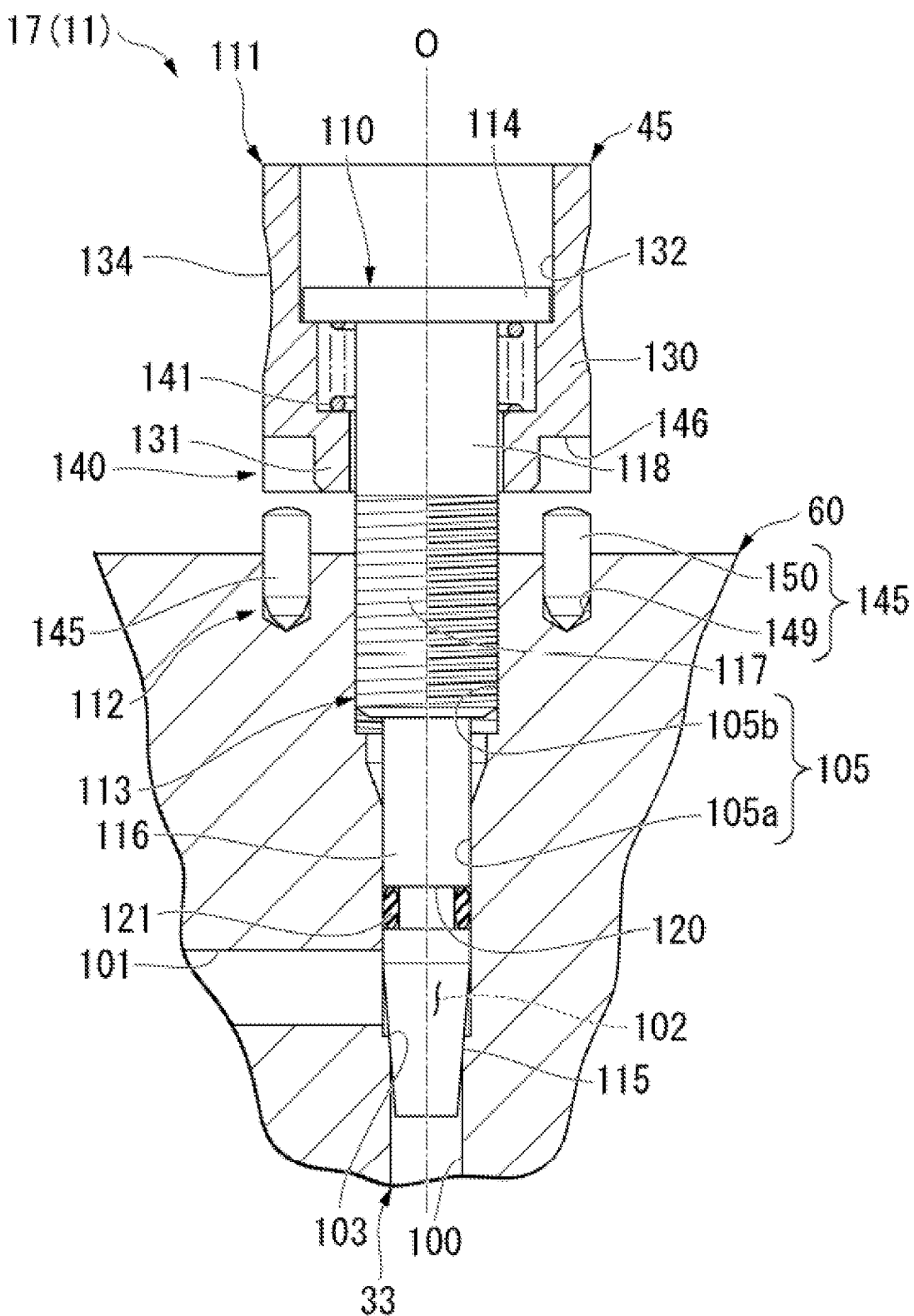
FIG. 6 is a sectional view corresponding to FIG. 3 and shows a permitted state.

FIG. 6 is a sectional view corresponding to FIG. 3 and shows the permitted state. As shown in FIG. 6, the prohibition mechanism 140 exits the above-described prohibited state in such a manner that the knob 111 moves in the axial direction away from the tube socket 60 and the knob engaging portions 146 resultantly move away from the tube socket engaging portions 145. This undoes the engagement between the tube socket engaging portions 145 and the knob engaging portions 146, thereby permitting the knob 111 to rotate around the axis O relative to the tube socket 60 (the permitted state).

As shown in FIG. 3, the energizing member 141 is interposed between the rod 110 and the knob 111. The energizing member 141 is, for example, a coil spring. The energizing member 141 is interposed between the rod flange 114 and the knob flange 131 while surrounding the rod 110. The energizing member 141 energizes the knob 111 toward the surface of the tube socket 60 (in such a direction that the prohibited state described above is to be achieved). The energizing member 141 can be attached at any position selected as appropriate provided that the energizing member 141 energizes the knob 111 in such a direction that the prohibited state is to be achieved. For example, the energizing member 141 may be positioned outside the knob 111, instead of inside the knob 111.

<Flow Rate Adjusting Method>

The following now describes a flow rate adjusting method performed using the flow rate adjusting device 17. The following description is made under the assumption that, at the initial position, the knob 111 is in the prohibited state, in other words, the rotation of the knob 111 relative to the tube socket 60 is prohibited. As shown in FIG. 6, the flow rate adjusting method starts with moving the knob 111 to transition to the permitted state. Specifically, the knob 111 is pulled so that the knob 111 moves away from the tube socket 60 against the energizing force exercised by the energizing member 141. This withdraws the pins 150 out of the knob engaging portions 146, thereby undoing the engagement between the tube socket engaging portions 145 and the knob engaging portions 146. As a result of this, the knob 111 is placed in the permitted state.

Figure 7:
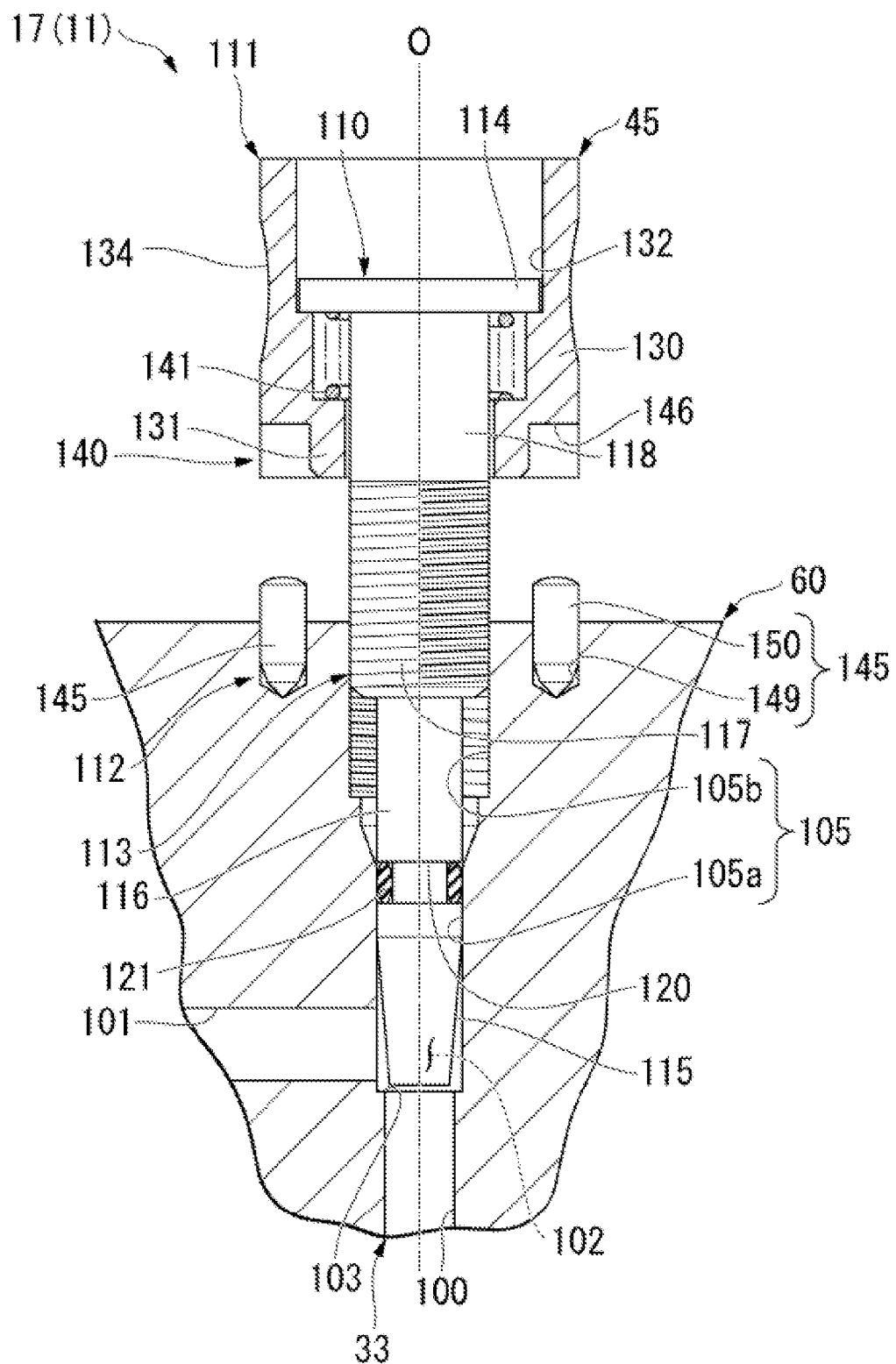
FIG. 7 is a sectional view corresponding to FIG. 3 and shows the permitted state.

FIG. 7 is a sectional view corresponding to FIG. 3 and shows the permitted state. Subsequently, as shown in FIG. 7, the rod 110 is rotated around the axis O via the knob 111. The rotational force applied to the knob 111 also acts on the rod 110 via the rotation stopping portions 122 and 135. As a result, the rod 110 and the knob 111 integrally rotate relative to the tube socket 60. As a result of its rotation relative to the tube socket 60, the rod 110 moves in the axial direction relative to the tube socket 60 while the sealing ring 121 is sliding on the inner peripheral surface of the sliding portion 105a. Specifically, as the rod 110 is rotated in such a direction as to fasten the male screw portion 117, the seat portion 115 moves in the valve closing direction. This reduces the area of the communication between the first flow channel 100 and the second flow channel 101 in the connecting flow channel 102 (reduces the ratio of opening of the connecting flow channel 102). As a result, the flow rate of the gas flowing between the first flow channel 100 and the second flow channel 101 can be reduced.

On the other hand, as the rod 110 is rotated in such a direction as to undo the fastening of the male screw portion 117, the seat portion 115 moves in the valve opening direction. This increases the area of the communication between the first flow channel 100 and the second flow channel 101 in the connecting flow channel 102 (increases the ratio of opening of the connecting flow channel 102). As a result, the flow rate of the gas flowing between the first flow channel 100 and the second flow channel 101 can be increased.

In the present embodiment, the ratio of opening of the connecting flow channel 102 (the rotational angle of the rod 110) can be identified by detecting the position of one of the knob engaging portions 146 in the circumferential direction. In other words, the ratio of opening of the connecting flow channel 102 can be identified by detecting, after the ratio of opening is adjusted, how much a given one of the knob engaging portions 146 is moved in the circumferential direction from the position of the given knob engaging portion 146 before the adjustment. The rotational angle of the rod 110 may be identified in the following manner. One of the tube socket 60 and the knob 111 may be indexed with marks and the other may be provided with an indicator for indicating one of the marks. If such is the case, only a mark indicating the above-described valve closed state may be provided, or the marks may be provided in increments of predetermined degrees indicating the rotational angle.

Figure 8:
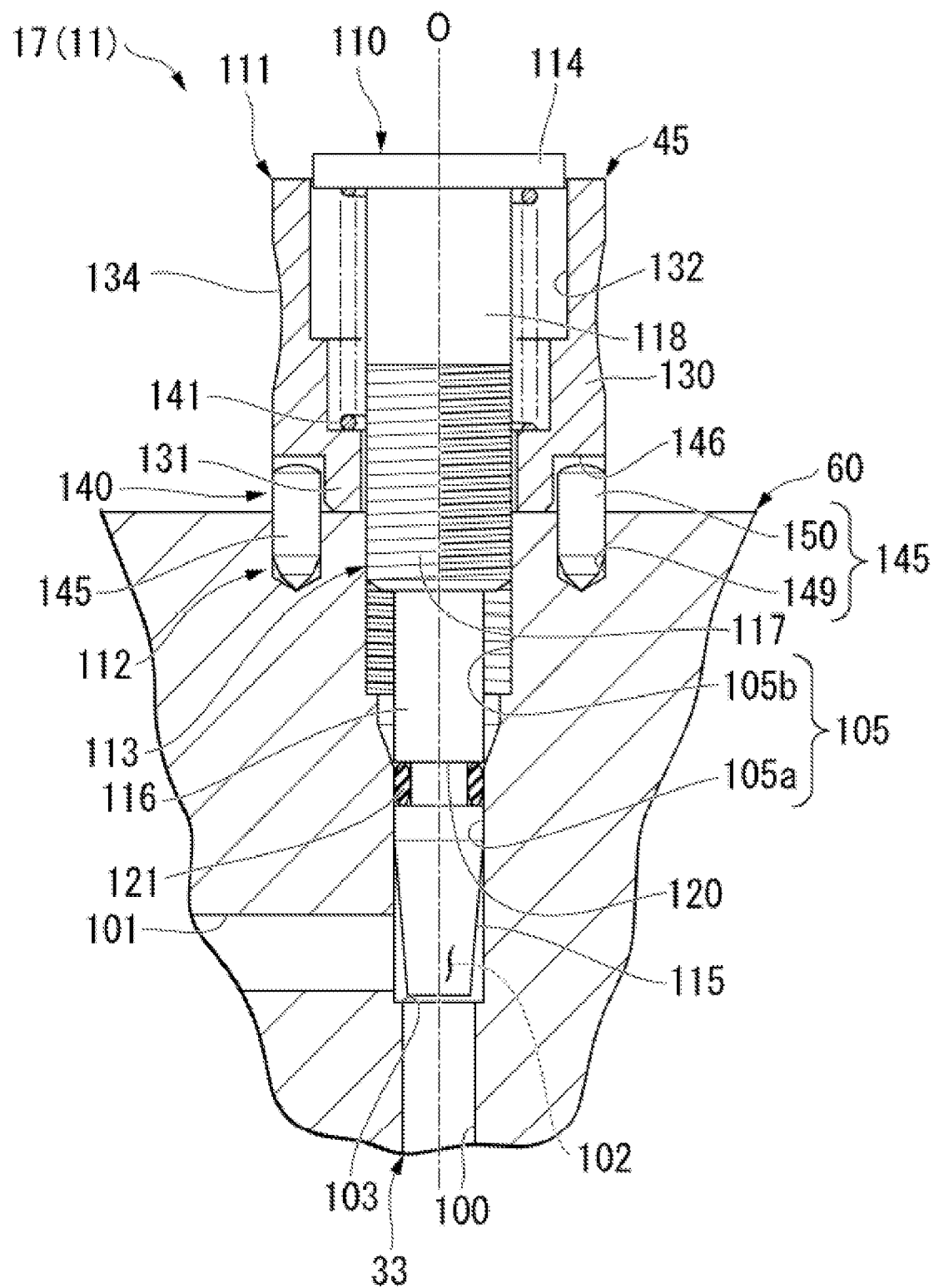
FIG. 8 is a sectional view corresponding to FIG. 3 and shows a prohibited state.

FIG. 8 is a sectional view corresponding to FIG. 3 and shows the prohibited state. As shown in FIG. 8, the knob 111 is again placed in the prohibited state after the ratio of opening is adjusted. Specifically, the knob 111 is rotated to a position where, as viewed in the axial direction, selected ones of the knob engaging portions 146 overlap the tube socket engaging portions 145. After this, the knob 111 is set free, as a result of which the energizing force exerted by the energizing member 141 moves the knob 111 toward the tube socket 60. Subsequently, the tube socket engaging portions 145 (the pins 150) enter the knob engaging portions 146, so that the tube socket engaging portions 145 are engaged in the circumferential direction with the knob engaging portions 146. This prohibits the rotation of the rod 110 and the knob 111 relative to the tube socket 60. In the above-described manner, the ratio of opening of the connecting flow channel 102 of the opening flow channel 33 is adjusted. The adjusting screws 45, 46, 51 and 52 can be manipulated to adjust the flow rate in the same manner as described above.

As described above, the knob 111 relating to the present embodiment is rotatable integrally with the rod 110 and movable in the axial direction relative to the rod 110. With such configurations, the rotational force applied to the knob 111 also acts on the rod 110, so that the rod 110 can be rotated via the knob 111. Such configurations can accomplish improved workability when compared with the case where, for example, the rod 110 is rotated using a mechanical tool or the like. Furthermore, in the present embodiment, the knob 111 moves in the axial direction relative to the rod 110, which can switch whether the rod 110 is in the prohibited state or the permitted state. When compared with the conventional design where a separately prepared nut is fastened on the rod so that the rotation of the rod is prohibited by axial force applied between the rod and the tube socket via the nut, the above-described design can highly accurately adjust the position of the rod 110 in the axial direction. In the conventional art, the position of the rod in the axial direction is adjusted, after which the rod may move out of the position in the axial direction when the nut is fastened on the rod to fix the position. Such a movement can be prevented by the present embodiment. Accordingly, a desired ratio of opening can be easily achieved by manipulating the adjusting screws 45, 46, 51 and 52.

In particular, the adjusting screws 45, 46, 51 and 52 are attached to the tube socket 60, where the flow channels 33, 34 are formed in the present embodiment. In this design, the rotation of the adjusting screws 45, 46, 51 and 52 is prohibited or permitted relative to the tube socket 60, which is a flow channel member. Accordingly, the adjusting screws 45, 46, 51 and 52 protrude less from the tube socket 60 than when a separately prepared body or other member is attached as a coupler connecting together the fluid compressor and other members. This can reduce the size of the flow rate adjusting device 17. As a consequence, the flow rate adjusting device 17 can be easily installed within a limited space such as a railroad vehicle. In addition, since the rod 110 and the knob 111 are supported on the tube socket 60, the adjusting screws 45, 46, 51 and 52 can be easily supported with sufficient strength.

In the present embodiment, the knob 111 is placed in the prohibited state when positioned close to the tube socket 60 and placed in the permitted state when positioned distant from the tube socket 60. According to such a design, the knob 111 remains close to the tube socket 60 while the flow rate adjusting device 17 is ordinarily used after the ratio of opening is adjusted (except while the ratio of opening is being adjusted). Therefore, the knob 111 can protrude less from the tube socket 60.

In the present embodiment, the adjusting screws 45, 46, 51 and 52 include the energizing member 141 for energizing the knob 111 toward the prohibited state. This design can lower the possibility of the knob 111 being left in the permitted state and accordingly reduce unexpected rotation of the rod 110.

In the present embodiment, the energizing member 141 is interposed between the rod flange 114 of the rod 110 and the knob flange 131 of the knob 111. Since the energizing member 141 is interposed between the rod 110 and the knob 111, the adjusting screws 45, 46, 51 and 52 can be reduced in size when compared with the case where the energizing member 141 is arranged outside the rod 110 or knob 111.

In the present embodiment, the knob 111 surrounds the rod 110. In this design, the rod 110 is less visible from outside, external force is prevented from directly acting on the rod 110, and the rod 110 can be prevented from unexpectedly rotating.

In the present embodiment, the grip 134 is formed on the outer peripheral surface of the knob 111. This design allows easy manipulation of the knob 111 via the grip 134 and can thus achieve further improvement in maneuverability.

In the present embodiment, the rotation stopping portions 122 and 135 of the rod 110 and the knob 111 are flat surfaces that, when engaged with each other, prohibits the rotation of the knob 111 relative to the rod 110. Since the rotation stopping portions 122 and 135 are flat surfaces that may touch each other, relatively simple machining is only required to prohibit the rotation of the knob 111 relative to the rod 110.

In the present embodiment, the rotation of the knob 111 relative to the tube socket 60 is prohibited by the engagement in the circumferential direction between the tube socket engaging portions 145 with the pins 150 and the knob engaging portions 146 formed in the form of a depression. In this design, the prohibited state can be achieved simply by allowing the tube socket engaging portions 145 to be accommodated within the knob engaging portions 146, which results from the knob 111 moving in the axial direction relative to the rod 110. Accordingly, the prohibited state can be simply and reliably maintained.

In the present embodiment, the tube socket engaging portions 145 protrude from the tube socket 60, and the knob engaging portions 146 are depressed into the knob 111. According to this design, the knob 111 itself can be reduced in size when compared with the case where, for example, one or more protrusions are formed on the knob 111 and one or more depressions are formed in the tube socket 60. Furthermore, in the present embodiment, the knob engaging portions 146 are also open through the outer peripheral surface of the knob 111. In this way, the knob 111 can achieve a smaller size than in a case where the knob engaging portions 146 are open only through the front-end surface of the knob 111.

In the present embodiment, the tube socket engaging portions 145 are structured such that the pin 150 is pressed into the depression 149 formed in the tube socket 60. As this design is employed, the machining can be done in an improved manner when compared with the case where one or more protrusions are directly formed on the tube socket 60. In addition, for example, the tube socket 60 and the tube socket engaging portions 145 can be made of separately selected suitable materials. This can improve the flexibility in selecting the materials.

In the present embodiment, the number of the knob engaging portions 146 is greater than the number of the tube socket engaging portions 145. According to this design, the knob 111 can be placed in the prohibited state relative to the tube socket 60 at more positions without the need of increasing the number of machining steps performed on the tube socket 60. As a result, the rotational angle of the knob 111 can be adjusted in finer increments, and the ratio of opening can be finely adjusted using the adjusting screws 45, 46, 51 and 52.

In the present embodiment, the sealing ring 121, which can seal together in the radial direction the rod 110 and the communicating portion 105, is interposed between the outer peripheral surface of the rod 110 and the inner peripheral surface of the communicating portion 105. For example, when a sealing member is sandwiched in the axial direction between the rod 110 and the tube socket 60, the energizing force exerted by the sealing member may move the rod in the axial direction after the ratio of opening is adjusted. The above design can prevent such a movement. As a result, while reliable sealing is accomplished between the rod 110 and the tube socket 60, the position of the rod 110 in the axial direction relative to the tube socket 60 can be highly accurately adjusted and a desired ratio of opening can be accomplished by manipulating the adjusting screws 45, 46, 51 and 52.

In the present embodiment, the tube socket 60 is formed in a shape of a block. In this manner, a variety of flow channels can be formed in the tube socket 60, which can reduce the size of the flow rate adjusting device 17.

In the present embodiment, the plurality of adjusting screws 45, 46, 51 and 52 are provided on the single tube socket 60. According to this design, when compared with the case where a plurality of bodies or other members are provided respectively for the adjusting screws 45, 46, 51 and 52, the flow rate adjusting device 17 can provide for a smaller size.

The door driving device 11 relating to the present embodiment is provided with the above-described flow rate adjusting device 17. Accordingly, the rate of acceleration or deceleration of the door body 10 can be adjusted in a simplified manner while a reduced size is achieved.

OTHER MODIFICATION EXAMPLES

The preferred embodiments described above do not limit the present invention. The embodiments can be modified by adding, omitting and replacing some or all of the features without departing from the scope of the invention. The present invention is not limited by the above description but only by the appended claims. The above-described embodiment includes the plurality of adjusting screws 45, 46, 51 and 52 for the single tube socket 60, but the present invention is not limited to such. The present invention only requires that at least one adjusting screw be provided for the single tube socket 60. The above-described embodiment includes depressions and protrusions as the prohibition mechanism 140, but the present invention is not limited to such. The prohibition mechanism 140 can be configured in any manner as long as it can prohibit the rotation of the knob 111 relative to the tube socket 60 due to mechanical engagement in the circumferential direction in the prohibited state. For example, splines (to-be-engaged portions) may be formed on the outer peripheral surface of the knob and protrusions (engaging portions) may be formed that are configured to be accommodated between the teeth of the splines. According to the above-described embodiment, the depressions (knob engaging portions 146) are formed in the knob 111 and the protrusions (tube socket engaging portions 145) are formed on the tube socket 60. The present invention is not limited to such and the protrusions may be formed on the knob 111 and the depressions may be formed in the tube socket 60.

The features described throughout this disclosure may be adequately replaced by known features or elements without departing from the spirit of the present invention, and the above-described modification examples may be appropriately combined.

What is claimed is:

1. A flow rate adjusting device comprising:
   a flow channel member having a flow channel and a female screw portion formed therein, the flow channel configured and arranged for air to flow therethrough to a cylinder of a door; and
   a valve mechanism for adjusting a ratio of opening of the flow channel,
   wherein the valve mechanism includes:
   a rod extending in a traverse direction traversing the flow channel, the rod having a male screw portion configured to be threaded with the female screw portion of the flow channel member, the rod being movable in the traverse direction when rotated on an axis extending along the traverse direction, so that the rod touches or separates from a valve seat formed on an inner surface of the flow channel;
   a knob attached to a portion of the rod that is outside the flow channel member, the knob being integrally rotatable with the rod and being movable in the traverse direction relative to the rod; and
   a lock mechanism having an engaging portion and a to-be-engaged portion, the engaging portion protruding from one of the flow channel member and the knob, the to-be-engaged portion being formed in the other of the flow channel member and the knob and configured to be engaged with the engaging portion when accommodating the engaging portion therein, and
   wherein the male screw portion of the rod is fastened by the female screw portion of the flow channel member in response to rotation of the knob,
   wherein the engaging portion protrudes from the flow channel member in the traverse direction,
   wherein the to-be-engaged portion is a depression in a surface of the knob facing the flow channel member and depressed in the traverse direction,
   wherein the engaging portion is engaged with the to-be-engaged portion in a circumferential direction around the axis when the knob is in a prohibited state,
   wherein the engaging portion is a pin pressed into a depression formed in the flow channel member, and
   wherein the lock mechanism is switched by the knob moving in the traverse direction between (i) the prohibited state in which the engaging portion is engaged with the to-be-engaged portion so that the rotation of the rod relative to the flow channel member is prohibited via the knob and (ii) a permitted state in which the engagement between the engaging portion and the to-be-engaged portion is undone so that the rod is permitted to rotate relative to the flow channel member.

2. The flow rate adjusting device of claim 1, wherein the knob is closer to the flow channel member in the prohibited state than in the permitted state.

3. The flow rate adjusting device of claim 1, wherein the valve mechanism includes an energizing member for energizing the knob in such a direction that the prohibited state is to be achieved.

4. The flow rate adjusting device of claim 3, wherein the rod has:
   a shaft extending in the traverse direction; and
   a rod flange having a larger outer diameter than the shaft, wherein the knob has a knob flange facing the rod flange in the traverse direction, and wherein the energizing member is interposed between the rod flange and the knob flange with the shaft being inserted into the energizing member.

5. The flow rate adjusting device of claim 1, wherein the knob surrounds the rod.

6. The flow rate adjusting device of claim 5, wherein the knob has a grip depressed into an outer peripheral surface of the knob.

7. The flow rate adjusting device of claim 5, wherein an outer peripheral surface of the rod and an inner peripheral surface of the knob have a flat surface, and the knob is not allowed to rotate relative to the rod when the flat surface of the outer peripheral surface of the rod is engaged with the flat surface of the inner peripheral surface of the knob.

8. The flow rate adjusting device of claim 1, wherein a plurality of the engaging portions and a plurality of the to-be-engaged portions are arranged in the circumferential direction, and wherein the number of the to-be-engaged portions is greater than the number of the engaging portions.

9. The flow rate adjusting device of claim 1, wherein the flow channel member has a communicating portion formed therein through which the inside of the flow channel is in communication with the outside of the flow channel in the traverse direction, and the rod is inserted through the communicating portion, and wherein a sealing ring is interposed between an outer peripheral surface of the rod and an inner peripheral surface of the communicating portion, surrounds the rod, and seals, in a direction intersecting the traverse direction in a planar view as seen in the traverse direction, between the outer peripheral surface of the rod and the inner peripheral surface of the communicating portion.

10. A flow rate adjusting device comprising:

a flow channel member having a flow channel and a female screw portion formed therein, the flow channel configured and arranged for air to flow therethrough to a cylinder of a door; and a valve mechanism for adjusting a ratio of opening of the flow channel, wherein the valve mechanism includes:

a rod extending in a traverse direction traversing the flow channel, the rod having a male screw portion configured to be threaded with the female screw portion of the flow channel member, the rod being movable in the traverse direction when rotated on an axis extending along the traverse direction, so that the rod touches or separates from a valve seat formed on an inner surface of the flow channel;

a knob attached to a portion of the rod that is outside the flow channel member, the knob being integrally rotatable with the rod and being movable in the traverse direction relative to the rod; and a lock mechanism having an engaging portion and a to-be-engaged portion, the engaging portion protruding from one of the flow channel member and the knob, the to-be-engaged portion being formed in the other of the flow channel member and the knob and configured to be engaged with the engaging portion when accommodating the engaging portion therein, and wherein the male screw portion of the rod is fastened by the female screw portion of the flow channel member in response to rotation of the knob, wherein the engaging portion protrudes from the flow channel member in the traverse direction, wherein the to-be-engaged portion is a depression in a surface of the knob facing the flow channel member and depressed in the traverse direction, wherein the engaging portion is engaged with the to-be-engaged portion in a circumferential direction around the axis when the knob is in a prohibited state, wherein a plurality of the engaging portions and a plurality of the to-be-engaged portions are arranged in the circumferential direction, wherein the number of the to-be-engaged portions is greater than the number of the engaging portions, and wherein the lock mechanism is switched by the knob moving in the traverse direction between (i) the prohibited state in which the engaging portion is engaged with the to-be-engaged portion so that the rotation of the rod relative to the flow channel member is prohibited via the knob and (ii) a permitted state in which the engagement between the engaging portion and the to-be-engaged portion is undone so that the rod is permitted to rotate relative to the flow channel member.

11. The flow rate adjusting device of claim 10, wherein the knob is closer to the flow channel member in the prohibited state than in the permitted state.

12. The flow rate adjusting device of claim 10, wherein the valve mechanism includes an energizing member for energizing the knob in such a direction that the prohibited state is to be achieved.

13. The flow rate adjusting device of claim 12, wherein the rod has:

a shaft extending in the traverse direction; and a rod flange having a larger outer diameter than the shaft, wherein the knob has a knob flange facing the rod flange in the traverse direction, and wherein the energizing member is interposed between the rod flange and the knob flange with the shaft being inserted into the energizing member.

14. The flow rate adjusting device of claim 10, wherein the knob surrounds the rod.

15. The flow rate adjusting device of claim 14, wherein the knob has a grip depressed into an outer peripheral surface of the knob.

16. The flow rate adjusting device of claim 14, wherein an outer peripheral surface of the rod and an inner peripheral surface of the knob have a flat surface, and the knob is not allowed to rotate relative to the rod when the flat surface of the outer peripheral surface of the rod is engaged with the flat surface of the inner peripheral surface of the knob.

17. The flow rate adjusting device of claim 10, wherein the flow channel member has a communicating portion formed therein through which the inside of the flow channel is in communication with the outside of the flow channel in the traverse direction, and the rod is inserted through the communicating portion, and wherein a sealing ring is interposed between an outer peripheral surface of the rod and an inner peripheral surface of the communicating portion, surrounds the rod, and seals, in a direction intersecting the traverse direction in a planar view as seen in the traverse direction, between the outer peripheral surface of the rod and the inner peripheral surface of the communicating portion.

* * * * *